(12) United States Patent
Lee et al.

(10) Patent No.: US 12,134,015 B2
(45) Date of Patent: Nov. 5, 2024

(54) HOLE POSITION UPDATE APPARATUS, HOLE POSITION UPDATE SYSTEM AND HOLE CUTTER

(71) Applicant: VC INC., Seoul (KR)

(72) Inventors: Hakyong Lee, Yongin-si (KR); Hee Joon Park, Gwangju-si (KR); Yongwoo Lee, Seongnam-si (KR); Juno Kim, Seongnam-si (KR); Jeongho Park, Gunpo-si (KR)

(73) Assignee: VC INC., Seoul (KR)

( * ) Notice: Subject to any disclaimer, the term of this patent is extended or adjusted under 35 U.S.C. 154(b) by 0 days.

(21) Appl. No.: 17/766,582

(22) PCT Filed: Jul. 23, 2020

(86) PCT No.: PCT/KR2020/009715
§ 371 (c)(1),
(2) Date: Apr. 5, 2022

(87) PCT Pub. No.: WO2021/071070
PCT Pub. Date: Apr. 15, 2021

(65) Prior Publication Data
US 2024/0108953 A1    Apr. 4, 2024

(30) Foreign Application Priority Data

Oct. 8, 2019  (KR) .................. 10-2019-0124751

(51) Int. Cl.
*A63B 57/30* (2015.01)
*A63B 57/40* (2015.01)

(52) U.S. Cl.
CPC ............ *A63B 57/357* (2015.10); *A63B 57/40* (2015.10); *A63B 2220/12* (2013.01); *A63B 2225/685* (2013.01)

(58) Field of Classification Search
CPC ... A63B 57/357; A63B 57/40; A63B 2220/12; A63B 2225/685
See application file for complete search history.

(56) References Cited

U.S. PATENT DOCUMENTS

2006/0231294 A1* 10/2006 Hansen .................. A63B 57/40
                                                                175/374
2009/0120655 A1*  5/2009 Hansen ................ A63B 57/357
                                                                 172/19
(Continued)

FOREIGN PATENT DOCUMENTS

JP    2006-136641    6/2006
JP    2014-117570    6/2014
(Continued)

OTHER PUBLICATIONS

KIPO, PCT Search Report & Written Opinion of PCT/KR2020/009715 dated Oct. 27, 2020.

*Primary Examiner* — Malina D. Blaise
(74) *Attorney, Agent, or Firm* — LEX IP MEISTER, PLLC

(57) ABSTRACT

Disclosed are a hole location updating device, a hole location updating system, and a hole cutter. The hole location updating device including a hole cutter combiner providing a combination to a hole cutter that includes: a GPS circuit for detecting a global positioning system (GPS) position on the hole location updating device; a mobile communication circuit for providing access to a server through a mobile communication network; and a control circuit for transmitting the GPS position to the server by use of the mobile communication circuit in response to a wakeup signal.

16 Claims, 11 Drawing Sheets

(56) References Cited

U.S. PATENT DOCUMENTS

| | | | |
|---|---|---|---|
| 2011/0273196 A1* | 11/2011 | Hill | A01G 25/167 |
| | | | 324/696 |
| 2013/0056232 A1* | 3/2013 | Rahm | A01C 5/02 |
| | | | 172/22 |
| 2014/0239065 A1 | 8/2014 | Zhou | |
| 2017/0239540 A1* | 8/2017 | Chan | A63B 57/50 |
| 2017/0241923 A1* | 8/2017 | Chan | A01G 20/00 |
| 2017/0356262 A1* | 12/2017 | Froemming | E21B 7/027 |
| 2018/0033311 A1* | 2/2018 | Berggren | G01S 19/01 |
| 2018/0333629 A1* | 11/2018 | Saitoh | G01C 21/20 |
| 2019/0255418 A1* | 8/2019 | Seo | A63B 69/3605 |
| 2023/0226419 A1* | 7/2023 | Falk | B25D 9/12 |
| | | | 172/22 |

FOREIGN PATENT DOCUMENTS

| | | |
|---|---|---|
| JP | 2016-163627 | 9/2016 |
| JP | 2017-220081 | 12/2017 |
| JP | 2018-191985 | 12/2018 |
| JP | 2019-090970 | 6/2019 |
| KR | 10-2012-0009304 | 2/2012 |
| KR | 10-2015-0001132 | 1/2015 |
| KR | 10-1968963 | 4/2019 |

\* cited by examiner

HOLE POSITION UPDATE APPARATUS, HOLE POSITION UPDATE SYSTEM AND HOLE CUTTER

CROSS-REFERENCE TO RELATED APPLICATION

This application claims priority to and the benefit of Korean Patent Application No. 10-2019-0124751 filed in the Korean Intellectual Property Office on Oct. 8, 2019, the entire contents of which are incorporated herein by reference.

BACKGROUND OF THE INVENTION (a) Field of the Invention

The present invention relates to a hole location updating device, a hole location updating system, and a hole cutter.

(b) Description of the Related Art

Golf is a sport in which a golf ball is struck into holes. A golfer considers a current position of the golf ball and a position of the hole to determine a target spot, and selects a suitable club and strikes the golf ball so that the golf ball may fly to the target spot.

To find the position of the hole and a distance to the hole from the current position, the golfer refers to distance-marking fixed facilities installed along a hole cutter (or a pin) put in the hole and a fairway. However, as the position of the hole frequently changes, it may not be reflected to the fixed facilities. Hence, it is difficult for the golfer to accurately understand the distance to the hole from the current position.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a hole location updating device for providing a changed position of a hole to a golfer, a hole location updating system, and a hole cutter.

An embodiment of the present invention provides a hole location updating device including a hole cutter combiner providing a combination to a hole cutter, including: a GPS circuit for detecting a global positioning system (GPS) position on the hole location updating device; a mobile communication circuit for providing an access to a server through a mobile communication network; and a control circuit for transmitting the GPS position to the server by use of the mobile communication circuit in response to a wakeup signal.

The control circuit may supply power to the mobile communication circuit in response to the wakeup signal, may transmit the GPS position to the server, and may block supplying of power to the mobile communication circuit.

The hole location updating device may include at least one button, and the wakeup signal may be generated from a button input generated by the at least one button.

The hole location updating device may further include a sensor, and the wakeup signal may be generated from a sensor input generated by the sensor.

The sensor may include a gyro sensor, and the sensor input may be generated when a rotary motion of the hole location updating device is detected.

The sensor may include a touch sensor, and the sensor input may be generated when a tap operation of a user is detected.

The control circuit may compare map information including position information on a golf course and the GPS position, and may determine whether the hole location updating device is disposed in a green of the golf course.

The control circuit may set a data update period of the GPS circuit to be a first period when the hole location updating device is not disposed in the green of the golf course, and it may set the data update period of the GPS circuit to be a second period that is different from the first period when the hole location updating device is disposed in the green of the golf course.

Another embodiment of the present invention provides a hole cutter including: an excavator for excavating ground; a GPS circuit for detecting a GPS position; a mobile communication circuit for providing an access to a server through a mobile communication network; and the mobile communication circuit includes a control circuit for transmitting the GPS position to the server in response to a wakeup signal generated by at least one button or sensor.

Another embodiment of the present invention provides a hole location updating system including: a hole location updating device; and a server, wherein the hole location updating device may include a hole cutter combiner for providing a combination to a hole cutter, a GPS circuit for detecting a global positioning system (GPS) position on the hole location updating device, a mobile communication circuit for providing an access to the server through a mobile communication network, and a control circuit for transmitting the GPS position to the server by use of the mobile communication circuit in response to a wakeup signal, and the server may compare a stored hole location and the GPS position received from the hole location updating device and may determine whether to update the stored hole location with the GPS position.

The hole location updating device may include at least one button, and the wakeup signal may be generated from a button input generated by the at least one button.

The hole location updating device may further include a sensor, and the wakeup signal may be generated from a sensor input generated by the sensor.

Another embodiment of the present invention provides a hole location updating device including a hole cutter combiner providing a combination to a hole cutter, including: a GPS circuit for detecting a GPS position on the hole location updating device; a mobile communication circuit for providing an access to a server through a mobile communication network; and a control circuit for comparing a stored hole location and the GPS position detected by the GPS circuit to determine whether a hole location update is needed in response to a wakeup signal, and transmitting the GPS position to a server when the hole location update is determined to be needed.

When the hole location update is determined to be needed, the control circuit may supply power to the mobile communication circuit, and may transmit the GPS position to the server by using the mobile communication circuit.

The control circuit may transmit the GPS position to the server by using the mobile communication circuit, and may block supplying of power to the mobile communication circuit.

The hole location updating device may include at least one button, and the wakeup signal may be generated from a button input generated by the at least one button.

The hole location updating device may further include a sensor, and the wakeup signal may be generated from a sensor input generated by the sensor.

The sensor may include a gyro sensor, and the sensor input may be generated when a rotary motion of the hole location updating device is detected.

The control circuit may compare map information including position information on a golf course and the GPS position to determine whether the hole location updating device is disposed in a green of the golf course.

The control circuit may set a data update period of the GPS circuit to be a first period when the hole location updating device is not disposed in the green of the golf course, and it may set the data update period of the GPS circuit to be a second period that is different from the first period when the hole location updating device is disposed in the green of the golf course.

According to the present invention, the golfer may quickly receive the changed position of the hole, and the hole location updating device for providing the changed position of the hole to the golfer may minimize power consumption and may provide the accurate hole location to the golfer.

DETAILED DESCRIPTION OF THE EMBODIMENTS

Figure 1:
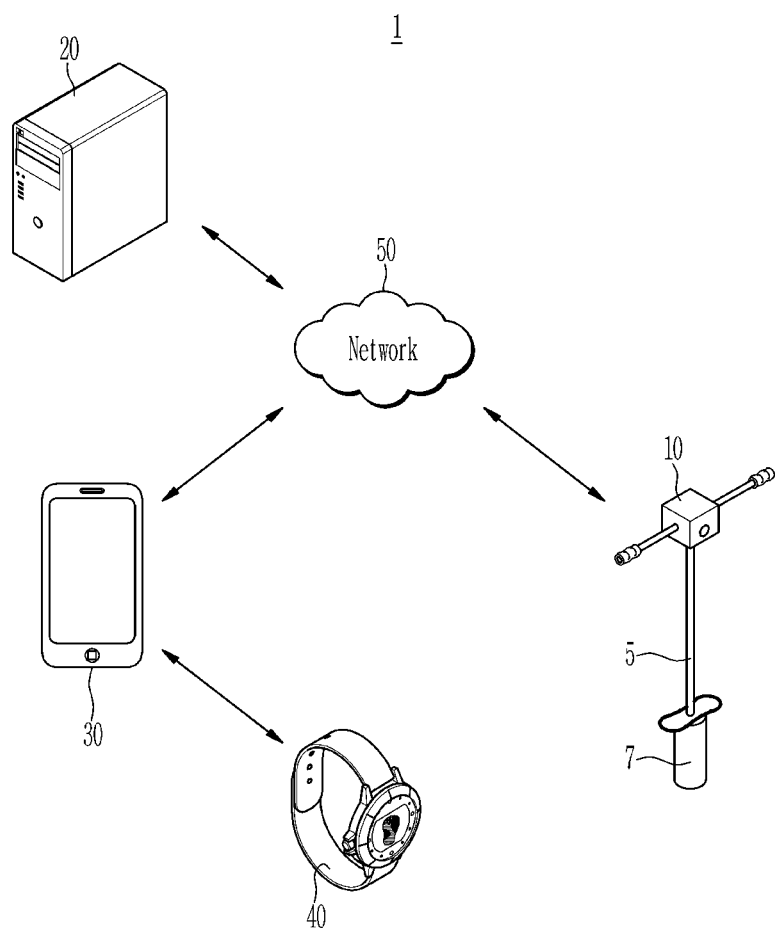
FIG. 1 shows a schematic diagram of a hole location updating system according to an embodiment of the present invention.

Embodiments disclosed in the present specification will be described in detail with reference to the accompanying drawings. In the present specification, the same or similar components will be denoted by the same or similar reference numerals, and an overlapped description thereof will be omitted. In describing embodiments of the present specification, when it is determined that a detailed description of the well-known art associated with the present invention may obscure the gist of the present invention, it will be omitted. The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

FIG. 1 shows a schematic diagram of a hole location updating system according to an embodiment of the present invention.

Referring to FIG. 1, the hole location updating system 1 according to an embodiment of the present invention may include a hole location updating device 10, a server 20, a mobile communication device 30, and a golf distance measuring device 40. However, a range of the present invention is not limited thereto, and the hole location updating system 1 may further include constituent elements in comparison to what are shown in FIG. 1 or some of the constituent elements shown in FIG. 1 may be omitted.

The hole location updating device 10 may be realized to be combined to a hole cutter 5. In some embodiments of the present invention, the hole location updating device 10 may be integrally combined to part of the hole cutter 5 or may be separated from part of the hole cutter 5.

A user, that is, a greenkeeper, may use the hole cutter 5 to move a hole positioned in a first spot of a green to a second spot. The hole cutter 5 may include an excavator 7 for excavating ground. For example, the greenkeeper may excavate a second spot in the green by using a method of pushing the excavator 7 into the ground while rotating the hole cutter 5 to the right and the left. The excavator 7 may maintain the soil excavated at the second spot while grabbing the soil in the excavator 7.

The greenkeeper may install a hole cup at the newly excavated second spot, and may insert the soil grabbed by the excavator 7 into the first spot, thereby filling the hole provided in the first spot. In this instance, the greenkeeper may perform a job by pushing the excavator 7 grabbing the soil into the ground while rotating the hole cutter 5 to the right and the left.

While the greenkeeper digs a hole with the hole cutter 5, a position (i.e., a position of the hole location updating device 10) of the hole cutter 5 may be a position of the hole. Therefore, while the greenkeeper digs the hole, the hole location updating device 10 may detect a current position of the hole. A detailed description of the hole location updating device 10 will be described in a later portion of the present specification with reference to FIG. 2 and FIG. 3.

The server 20 may be a computing device for providing a service to at least one of the hole location updating device 10, the mobile communication device 30, and the golf distance measuring device 40 through a network 50. That is, the server 20 may include arbitrary computing devices such as a personal computer for driving server software and providing a service to other devices or software, a blade server, or a main frame.

For example, the server 20 may provide a service for serving golf course related information in addition to golf course information, green position information, and hole location information to at least one of the hole location updating device 10, the mobile communication device 30, and the golf distance measuring device 40.

Particularly, the server 20 may perform a service for providing a hole location to the golfer. In detail, the server 20 may receive a GPS position of the hole location updating device 10 from the hole location updating device 10.

For example, when the hole location updating device 10 transmits a GPS position of the hole location updating device 10 to the server 20, and the GPS position received from the hole location updating device 10 has a difference from the hole location stored in the server 20 by greater than a predetermined range, the server 20 updates the stored hole location with the GPS position, and may, for example, provide updated hole location to the golfer through at least one of the mobile communication device 30 and the golf distance measuring device 40.

For another example, the hole location updating device 10 may be realized for the hole location updating device 10 to determine whether there is a need to update the GPS position of the hole location updating device 10. In detail, when a difference between the hole location stored in the hole location updating device 10 and the newly measured GPS position is greater than a predetermined range, the hole location updating device 10 may update the stored hole location with the GPS position and may transmit the corresponding GPS position to the server 20. The server 20 may provide the GPS position received from the hole location updating device 10 to the golfer as an updated hole location.

The mobile communication device 30 may be a terminal for accessing the server 20 through the network 50. The mobile communication device 30 may provide the golf course related information provided by the server 20 to a user. For example, the mobile communication device 30 may be a smartphone, a mobile phone, a tablet computer, and a laptop computer that are accessible to the mobile communication network, and the range of the present invention is not limited thereto.

The golf distance measuring device 40 may be a terminal that may be electrically accessible to the mobile communication device 30. The golf distance measuring device 40 may receive the golf course related information provided by the server 20 through the mobile communication device 30, and may provide the same to the user. Differing from what is shown in FIG. 1, the golf distance measuring device 40 may directly access the network 50. In this case, the golf distance measuring device 40 may directly receive the golf course related information provided by the server 20 and may provide the same to the user.

The golf distance measuring device 40 may be a wearable device, for example, a smart watch or a smart band, and the range of the present invention is not limited thereto.

The network 50 may include a mobile communication network including a cellular network, and a wireless network including a WiFi network and a Bluetooth network, and the range of the present invention is not limited thereto, and may include a wire network including a local area network (LAN) and a wide area network (WAN).

The hole location updating device 10 attached to the hole cutter 5 may measure the current hole location while the greenkeeper digs the hole, and it may transmit the measured hole location to the server 20 through the network 50, for example, a mobile communication network. When the hole location updating device 10 transmits the GPS position of the hole location updating device 10 to the server 20, the server 20 may compare the hole location stored in the server 20 and the GPS position and may determine the latest hole location. Differing from this, when the hole location updating device 10 compares the hole location stored in the hole location updating device 10 and the GPS position and determines the latest hole location, the server 20 may consider the GPS position received from the hole location updating device 10 as the latest hole location and may, if needed, additionally verify whether the GPS position received from the hole location updating device 10 corresponds to the latest hole location. The server 20 may transmit the latest hole location to the mobile communication device 30 through the network 50, and the mobile communication device 30 may, for example, provide the latest hole location to the golf distance measuring device 40 through an application performed by a smartphone.

Figure 2:
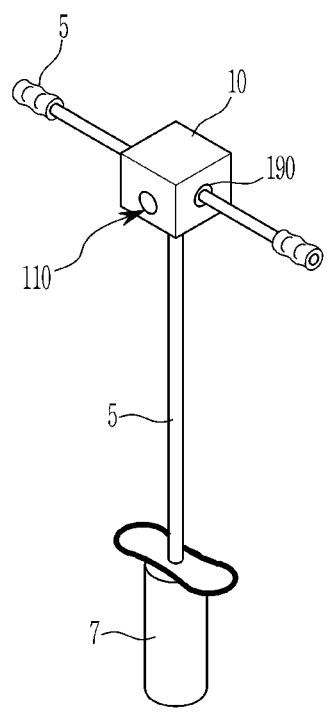
FIG. 2 shows a schematic diagram of a hole location updating device according to an embodiment of the present invention.

FIG. 2 shows a schematic diagram of a hole location updating device according to an embodiment of the present invention.

The golfer needs to accurately know a remaining distance to the hole from the position of the golfer. However, the position of the hole may be frequently changed to, for example, manage a green of the golf course and adjust a level of difficulty of the golf course. For ease of description, a method for providing a distance to a center of the green to the golfer, or a method for providing a distance to a designated spot to the golfer when the golfer designates the position of the hole may, precisely speaking, fail to provide the accurate position of the hole to the golfer.

To solve this problem, that is, to provide the accurate position of the hole to the golfer, a method for realizing a device for detecting positions in the hole or near the hole may be considered. That is, as shown in FIG. 2, as the hole cutter 5 used by the greenkeeper to dig the hole indicates the current hole location, the hole location updating device 10 for detecting the hole location in a form combined to the hole cutter 5 may be considered.

In the case of the hole cutter 5, the greenkeeper has to carry the hole cutter 5, so the hole location updating device 10 realized to be attached to the hole cutter 5 may receive power from a battery, and it is needed to manage the power to increase a battery use time. In addition, the greenkeeper may change the hole location in the current green (i.e., when he makes a hole in a position that is different from the existing hole location in the current green), and may move to the green of another course within a relatively short period of time and may modify the hole location. Therefore, it is needed to turn on a function for detecting the GPS position of the hole location updating device 10 as long as possible under the power management.

To solve this drawback, a method for minimizing power consumption of the hole location updating device 10 and detecting an accurate GPS position is required.

Referring to FIG. 2, the hole location updating device 10 may be realized to be combined to the hole cutter 5.

The hole location updating device 10 may include a hole cutter combiner 190 for providing a combination with the hole cutter 5. The hole cutter combiner 190 may, for example, be realized in a form of surrounding a connection portion of a handle of the hole cutter 5 and a supporter in a center, but the range of the present invention is not limited thereto, and it may be realized in various forms so that it may be combined and fixed to an arbitrary position of the hole cutter 5. A battery 160 for supplying power to the hole location updating device 10 may be included in the hole location updating device 10.

For example, supplying of power to constituent elements of the hole location updating device 10 may be intercepted according to control by the control circuit 100. For example, the mobile communication circuit 120 may enter a power blocking mode by the control circuit 100, and in this case, supplying of power to the mobile communication circuit 120 may be blocked. When a wakeup signal is detected, supplying of power to the mobile communication circuit 120 may start. That is, the wakeup signal represents a signal for extricating constituent elements of the hole location updating device 10 having entered the power blocking mode from the power blocking mode.

In some embodiments of the present invention, the wakeup signal may be generated from a button input generated by at least one button 110. For example, in some embodiments of the present invention, the hole location updating device 10 may include at least one button 110. When the greenkeeper presses at least one button 110 while digging a hole in a specific position with the hole cutter 5 (or just before/after digging the hole), the hole location updating device 10 may detect the current hole location, and may transmit the detected hole location to the server 20 through the network 50.

In some embodiments of the present invention, the wakeup signal may be generated from a sensor input generated by the sensor 130. For example, in some embodiments of the present invention, the hole location updating device 10 may include at least one sensor 130. When a rotary motion of the hole cutter 5 is detected by, for example, by a gyro sensor while the greenkeeper digs a hole in a specific position with the hole cutter 5, the hole location updating device 10 may detect the current hole location and may transmit the detected hole location to the server 20 through the network 50. In another way, when a tap operation performed on a touch sensor is detected as an example while the greenkeeper digs at a specific position with the hole cutter 5, the hole location updating device 10 may detect the current hole location and may transmit the detected hole location to the server 20 through the network 50.

As described above, the hole location updating device 10 may transmit the current hole location to the server 20, or it may compare the hole location stored in the hole location updating device 10 and a GPS position to determine a latest hole location and may transmit it to the server 20.

By updating the corresponding hole location when the greenkeeper positions the hole cutter 5 in a hole location, power consumption of the hole location updating device 10 may be minimized, and the accurate GPS position may be detected.

Figure 3:
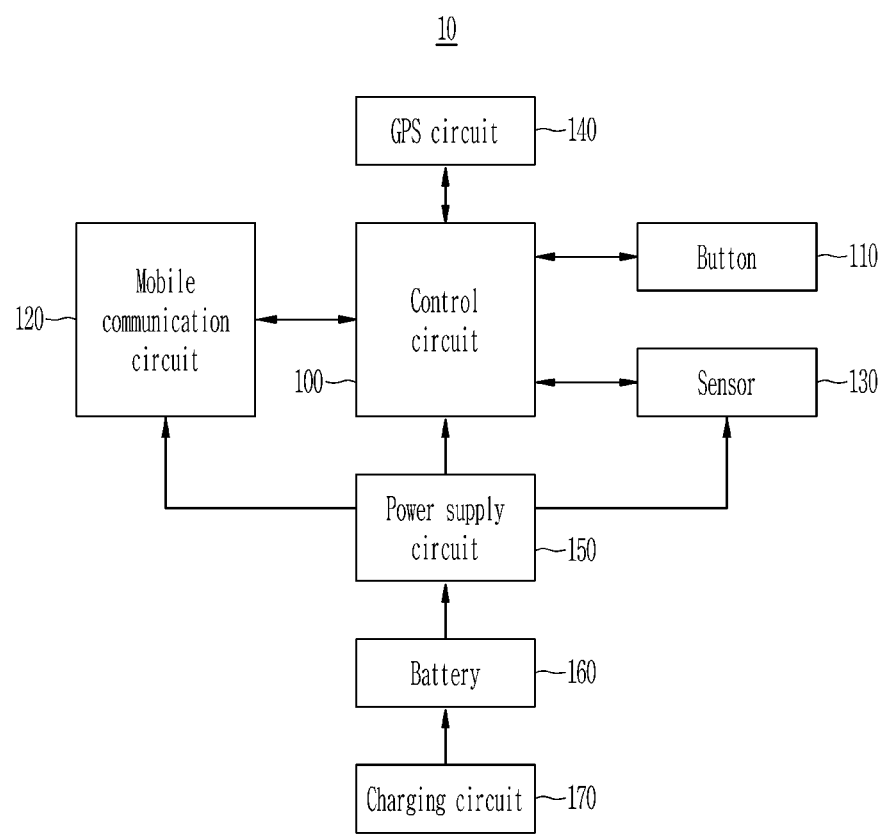
FIG. 3 shows a block diagram of a hole location updating device according to an embodiment of the present invention.

FIG. 3 shows a block diagram of a hole location updating device according to an embodiment of the present invention.

Referring to FIG. 3, the hole location updating device 10 may include a control circuit 100, a button 110, a mobile communication circuit 120, a gyro sensor 130, a GPS circuit 140, a power supply circuit 150, and a battery 160. Depending on whether the battery 160 is charged or not, the hole location updating device 10 may further include a charging circuit 170.

The control circuit 100 controls a general operation of the hole location updating device 10. The control circuit 100 may be realized with a processing circuit such as a microprocessor, a central processing unit (CPU), or an application processor (AP), and the range of the present invention is not limited thereto. The control circuit 100 may execute software or a program for realizing functions of the hole location updating device 10.

Particularly, the control circuit 100 may supply or block power to at least one of the control circuit 100, the mobile communication circuit 120, the sensor 130, and the GPS circuit 140 by controlling the power supply circuit 150.

The control circuit 100 may further include a wakeup signal detecting circuit for detecting the wakeup signal described with reference to FIG. 2. The wakeup signal detecting circuit may, for example, be realized by using a known interrupt detecting method, and the range of the present invention is not limited thereto.

The mobile communication circuit 120 may provide the access with the server 20 through the network 50, for example, a mobile communication network. In detail, when the control circuit 100 controls the power supply circuit 150 to supply power to the mobile communication circuit 120, the mobile communication circuit 120 provides the access with the server 20 through the network 50, and when the control circuit 100 controls the power supply circuit 150 to block the supplying of power to the mobile communication circuit 120, the mobile communication circuit 120 may be turned off.

The sensor 130 may include a gyro sensor. The sensor 130 may detect a rotary motion of the hole cutter 5. That is, the sensor 130 may detect a specific motion generated when a hole is made in the green, for example, a rotation by the hole cutter 5 in a clockwise direction or a counterclockwise direction.

The sensor 130 may include a touch sensor. The sensor 130 may detect a tap operation of a user. That is, the sensor 130 may, for example, detect whether the greenkeeper has performed a predetermined operation such as changing the hole location and performing a tap operation twice.

In some embodiments of the present invention, the hole location updating device 10 may be realized to include at least one of the button 100, the gyro sensor, and the touch sensor according to a detailed realization purpose.

The GPS circuit 140 may detect a GPS position on the hole. In detail, the GPS circuit 140 may detect the GPS position of the hole by detecting the GPS position of the hole location updating device 10. The GPS circuit 140 may include a GPS communication chip for communicating with a satellite and receiving coordinates of the GPS position.

The GPS circuit 140 may also be turned on/off when the control circuit 100 controls the power supply circuit 150, and particularly, the control circuit 100 may adjust a data update period of the GPS circuit 140.

For example, the control circuit 100 may compare map information including position information on a golf course and the GPS position detected by the GPS circuit 140 to determine whether the hole location updating device (10, or the hole cutter 5) is positioned in the green of the golf course, and when found that the same is not positioned in the green, a data update period of the GPS circuit 140 is set to be a first period, and when found that the same is positioned in the green, the data update period of the GPS circuit 140 may be set to be a second period that is different from the first period. The first period may be longer than the second period. In other words, when the hole location updating device 10 is positioned in the green, the control circuit 100 may control the GPS circuit 140 so as to further frequently detect the GPS position than the case in which the hole location updating device 10 is not positioned in the green.

The power supply circuit 150 may supply power to the control circuit 100, the mobile communication circuit 120, the sensor 130, and the GPS circuit 140 under control by the control circuit 100. The power supply circuit 150 may receive power from the battery 160.

In some embodiments of the present invention, the hole location updating device 10 may further include a charging circuit 170. For example, when the battery 160 of the hole location updating device 10 is realized as a chargeable battery, for example, a rechargeable battery, the charging circuit 170 may charge the battery 160.

In some embodiments of the present invention, when the battery 160 of the hole location updating device 10 is realized as a battery that is impossible to be charged, for example, a primary battery, the hole location updating device 10 may omit the charging circuit 170.

The control circuit 100 may, in response to a wakeup signal, that is, in response to a button input generated by at least one button 110, or in response to a sensor input generated by the sensor 130, transmit a newly measured GPS position to the server 20, or compare a stored hole location and a GPS position detected by the GPS circuit 140 to determine whether to need to update the hole location, and transmit the GPS position determined to be needed to update the hole location to the server 20.

Figure 4:
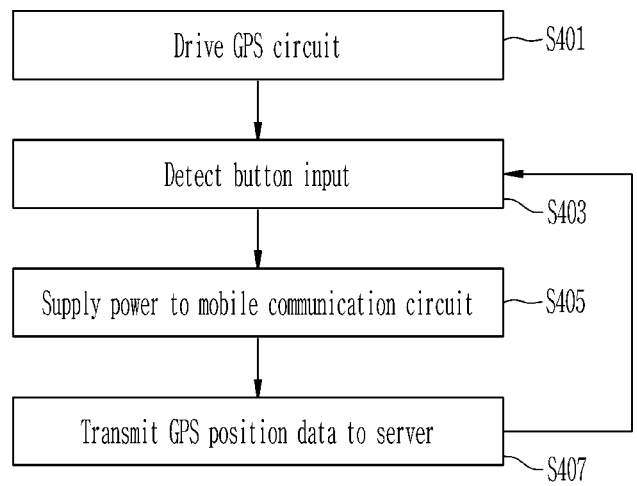
FIG. 4 shows a flowchart of a method for operating a hole location updating device according to an embodiment of the present invention.

FIG. 4 shows a flowchart of a method for operating a hole location updating device according to an embodiment of the present invention.

Referring to FIG. 4, the method for operating a hole location updating device 10 according to an embodiment of the present invention may include the control circuit 100 driving the GPS circuit 140 (S401). In consideration of an environment in which the greenkeeper changes the hole location in the green, and moves to the green of another course and changes the hole location within a relatively short time, the control circuit 100 may drive the GPS circuit 140 to be turned on all the time or most of the time while the greenkeeper uses the hole cutter 5, and the range of the present invention is not limited thereto.

The method may include the control circuit 100 detecting a button input (S403). The detecting of a button input may include detecting a button signal generated when the greenkeeper presses at least one button 110 of the hole location updating device 10 to notify that the hole location is changed. The detecting of a button signal may, for example, be realized by using a known interrupt detecting method, and the range of the present invention is not limited thereto.

In some embodiments of the present invention, the detecting of a button input by the control circuit 100 in S403 may be modified into the control circuit 100 detecting a tap operation of a user by using a touch sensor.

It has been described above that the stage of S401 is performed and the stage of S403 is then performed, and when the control circuit 100 detects a button input (S403) so as to reduce power consumption by constant driving of the GPS circuit 140, the control circuit 100 may drive the GPS circuit 140 (S401), and the present invention is not limited thereto.

The method may include the control circuit 100 supplying power to the mobile communication circuit 120 (S405), and determining whether the hole location updating device 10 successfully accesses the mobile communication network by using the mobile communication circuit 120, and transmitting GPS position data, that is, latest position data, to the server 20 (S407).

The control circuit 100 may transmit the GPS position data to the server 20, may block supplying of power to the mobile communication circuit 120, and may make the button input (or a touch sensor input) wait (S403).

The server 20 may compare the stored hole location and the GPS position received from the hole location updating device 10, and may determine whether to update the stored hole location with the received GPS position. When it is determined as that there is a need to update the hole location, this may signify a case in which a distance difference between the stored position data and the GPS position data is equal to or greater than a predetermined distance. For example, it may be determined as that there is a need to update the hole location when the distance difference between the stored position data and the GPS position data is equal to or greater than several meters such as equal to or greater than 1 m or equal to or greater than 2 m. The above-noted standard is no more than an example, and policies and algorithms for determining whether there is a need to update the hole location are modifiable in various ways depending on detailed realization purposes.

The server 20 may, when receiving a plurality of GPS positions from the hole location updating device 10, select the GPS position that is determined to be valid data from among the GPS positions. For example, the GPS position may be measured at least twice when the greenkeeper moves the hole positioned in the first spot to the second spot. When the greenkeeper rotates the hole cutter 5 from right to left so as to excavate the second spot, the gyro sensor detects the rotation, thereby performing the GPS measurement, and when the greenkeeper rotates the hole cutter 5 from right to left so as to fill the first spot with soil, the gyro sensor detects the rotation, thereby performing the GPS measurement, and for example, the server 20 may be realized to determine that the GPS position data received from the hole location updating device 10 for a first time is valid and the GPS position data received for a second time is not valid according to predetermined policies and algorithms considering a time for receiving the GPS position data provided by the hole location updating device 10.

When the difference between the GPS position received from the hole location updating device 10 and the stored hole location is greater than a predetermined range or when the GPS position received from the hole location updating device 10 corresponds to valid data and the difference between the GPS position and the hole location stored in the server 20 is greater than a predetermined range, the server 20 may update the stored hole location with the GPS position, and may provide the updated hole location to the golfer through, for example, at least one of the mobile communication device 30 and the golf distance measuring device 40.

According to the present embodiment, the hole location updating device 10 manages power by supplying power to the mobile communication circuit 120 when the measured GPS position data are transmitted to the server 20, and blocking the supplying of power to the mobile communication circuit 120 when the transmission to the server 20 is finished, and it supplies power to the GPS circuit 140 for a sufficient time frame, so the hole location updating device 10 may minimize power consumption and may provide the accurate hole location to the golfer.

However, in some embodiments of the present invention, the power supplying policy to the mobile communication circuit 120 is not limited to the present embodiment, and the method for supplying power to the mobile communication circuit 120 may be changed in various ways.

Figure 5:
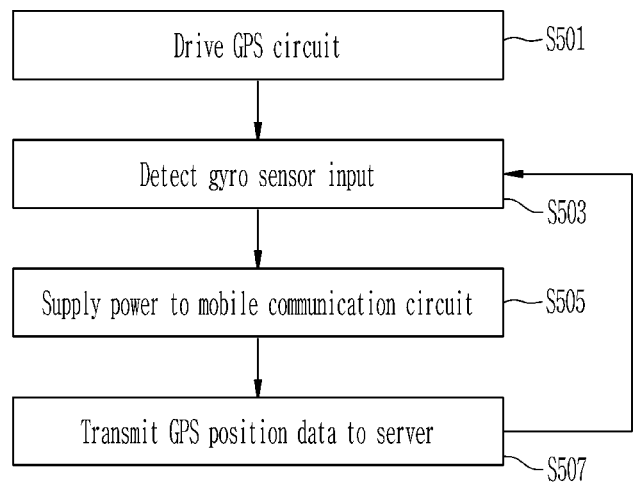
FIG. 5 shows a flowchart of a method for operating a hole location updating device according to an embodiment of the present invention.

FIG. 5 shows a flowchart of a method for operating a hole location updating device according to an embodiment of the present invention.

Referring to FIG. 5, the method for operating a hole location updating device 10 according to an embodiment of the present invention may include the control circuit 100 driving a GPS circuit 140 (S501).

The method may include the control circuit 100 detecting a gyro sensor input (S503). The detecting of a gyro sensor input may include detecting a sensor signal generated according to a rotary motion of the hole cutter 5 while the greenkeeper digs a hole. The detecting of a sensor signal may, for example, be realized by using a known interrupt detecting method, and the range of the present invention is not limited thereto.

It has been described above that the stage of S501 is performed and the stage of S503 is then performed, and so as to reduce power consumption caused by the constant driving of the GPS circuit 140, the control circuit 100 may drive the GPS circuit 140 (S501) when the control circuit 100 detects the gyro sensor input (S503), and the present invention is not limited thereto.

The method may include the control circuit 100 supplying power to the mobile communication circuit 120 (S505), and determining whether the hole location updating device 10 successfully accesses the mobile communication network by using the mobile communication circuit 120, and transmitting GPS position data, that is, the latest position data, to the server 20 (S507).

The control circuit 100 may transmit the GPS position data to the server 20, may block supplying of power to the mobile communication circuit 120, and may make the gyro sensor input wait (S503).

According to the present embodiment, the hole location updating device 10 manages power by supplying power to the mobile communication circuit 120 when the measured GPS position data are transmitted to the server 20, and blocking the supplying of power to the mobile communication circuit 120 when the transmission to the server 20 is finished, and it supplies power to the GPS circuit 140 for a sufficient time frame, so the hole location updating device 10 may minimize power consumption and may provide the accurate hole location to the golfer.

However, in some embodiments of the present invention, the power supplying policy to the mobile communication circuit 120 is not limited to the present embodiment, and the method for supplying power to the mobile communication circuit 120 may be changed in various ways.

Figure 6:
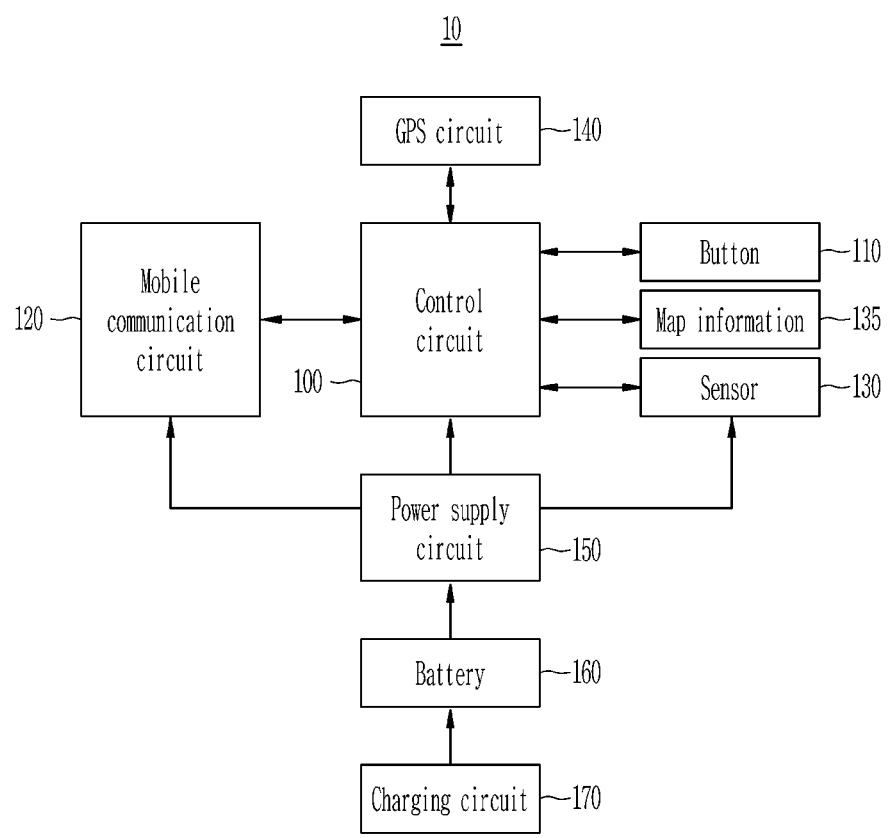
FIG. 6 shows a block diagram of a hole location updating device according to an embodiment of the present invention.

FIG. 6 shows a block diagram of a hole location updating device according to an embodiment of the present invention.

Referring to FIG. 6, the hole location updating device 10 may include a control circuit 100, a button 110, a mobile communication circuit 120, a gyro sensor 130, a GPS circuit 140, a power supply circuit 150, a battery 160, and map information 135. The hole location updating device 10 may further include a charging circuit 170 depending on whether the battery 160 is chargeable. Descriptions on the control circuit 100, the button 110, the mobile communication circuit 120, the sensor 130, the GPS circuit 140, the power supply circuit 150, the battery 160, and the charging circuit 170 may refer to what is described with reference to FIG. 3, and a detailed content will not be repeated.

The map information 135 may include position information on the golf course. For example, the map information 135 may include GPS position information on the corresponding golf course, for example, a fairway and a green area. The map information 135 may be stored in, for example, a register, a memory, or a storage device installed in the hole location updating device 10.

The control circuit 100 may compare the map information and the GPS position provided by the GPS module 140, and may determine whether the hole location updating device 10 is positioned in the green of the golf course.

When the hole location updating device is not positioned in the green of the golf course, the control circuit 100 may set a data update period of the GPS circuit 140 to be a first period, and when the hole location updating device is positioned in the green of the golf course, the control circuit 100 may set the data update period of the GPS circuit 140 to be a second period that is different from the first period.

The first period may be longer than the second period. In other words, when the hole location updating device 10 is positioned in the green, the control circuit 100 may control the GPS circuit 140 so as to further frequently detect the GPS position than the case in which the hole location updating device 10 is not positioned in the green.

Figure 7:
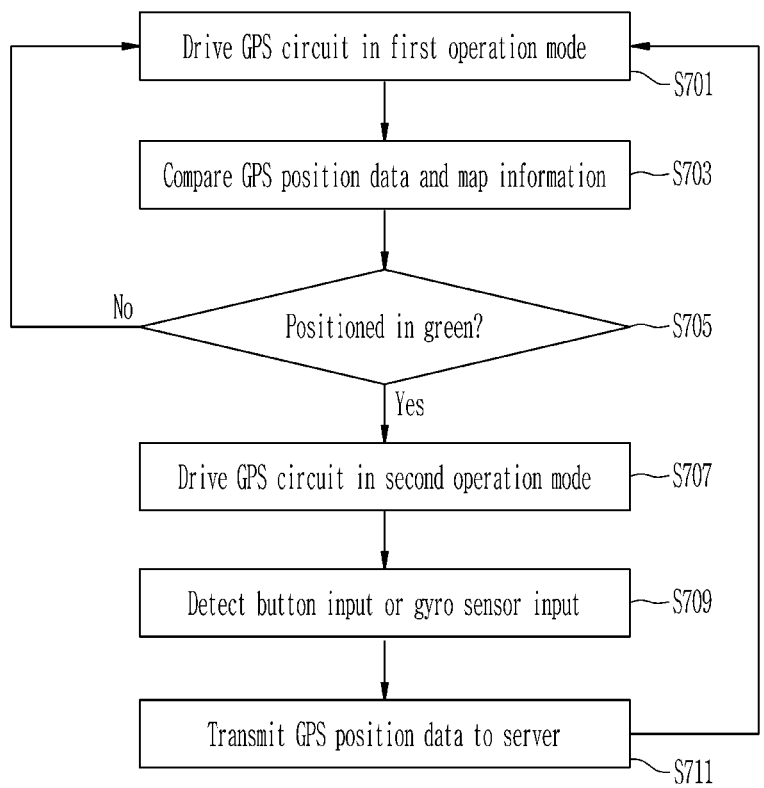
FIG. 7 shows a flowchart of a method for operating a hole location updating device according to an embodiment of the present invention.

FIG. 7 shows a flowchart of a method for operating a hole location updating device according to an embodiment of the present invention.

Referring to FIG. 7, the method for operating a hole location updating device according to an embodiment of the present invention may include the control circuit 100 driving the GPS circuit 140 in a first operation mode (S701). The first operation mode represents an operation mode of the GPS circuit 140 that is set for the data update period of the GPS circuit 140 to be the first period.

The method may include the control circuit 100 comparing the map information and the GPS position provided by the GPS module 140 (S703).

The method may include, according to a result of comparison, determining whether the hole location updating device 10 is positioned in the green of the golf course (S705). When the hole location updating device 10 is determined to be positioned in the green of the golf course (Yes in S707), the method may proceed to driving the GPS circuit 140 in a second operation mode (S707). The second operation mode represents an operation mode of the GPS circuit 140 for the data update period of the GPS circuit 140 to be the second period that is shorter than the first period.

The method may include, while driving the GPS circuit 140 in the second operation mode, the control circuit 100 detecting a button input or a gyro sensor input (S709) and transmitting the GPS position data to the server 20 (S711). A detailed content thereof has been described with reference to FIG. 3 to FIG. 5, so no repeated content will be described.

When the hole location updating device 10 is determined to not be positioned in the green of the golf course (No in S707), the method may proceed to driving the GPS circuit 140 in the first operation mode (S701).

According to the present embodiment, the hole location updating device 10 may further minimize power consumption and may provide the accurate hole location to the golfer by performing precise power management on the GPS circuit 140.

Figure 8:
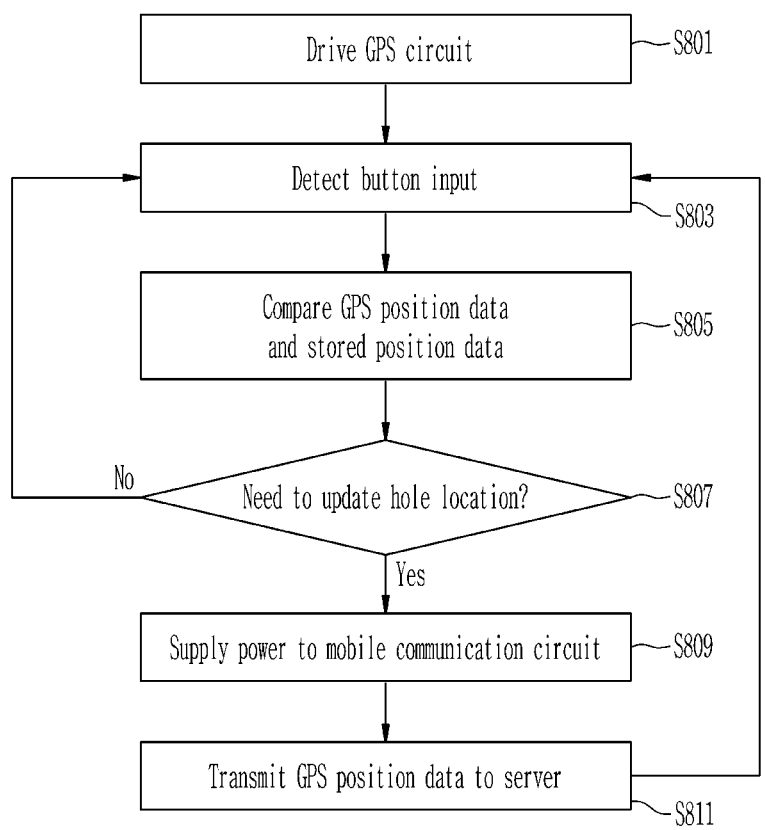
FIG. 8 shows a flowchart of a method for operating a hole location updating device according to an embodiment of the present invention.

FIG. 8 shows a flowchart of a method for operating a hole location updating device according to an embodiment of the present invention.

Referring to FIG. 8, the method for operating a hole location updating device according to an embodiment of the present invention may include the control circuit 100 driving the GPS circuit 140 (S801). In consideration of an environment in which the greenkeeper changes the hole location in the green, and moves to a green of another course and changes the hole location within a relatively short time, the control circuit 100 may drive the GPS circuit 140 to be turned on all the time or most of the time while the greenkeeper uses the hole cutter 5, and the range of the present invention is not limited thereto.

The method may include the control circuit 100 detecting a button input (S803). The detecting of a button input may include detecting a button signal generated when the greenkeeper presses at least one button 110 of the hole location updating device 10 to notify that the hole location is changed. The detecting of a button signal may, for example, be realized by using a known interrupt detecting method, and the range of the present invention is not limited thereto.

In some embodiments of the present invention, the detecting of a button input by the control circuit 100 in S803 may be modified into the control circuit 100 detecting a tap operation of a user by using a touch sensor.

It has been described above that the stage of S801 is performed and the stage of S803 is then performed, and when the control circuit 100 detects a button input (S803) so as to reduce power consumption by constant driving of the GPS circuit 140, the control circuit 100 may drive the GPS circuit 140 (S801), and the present invention is not limited thereto.

The method may include comparing the position data on the hole location stored in the hole location updating device 10 and the GPS position data (S805). The position data on the stored hole location may be stored in, for example, a register, a memory, or a storage device installed in the hole location updating device 10.

The method may include determining whether a hole location update is needed based on a result of comparison (S807), and when the hole location update is determined to be needed (Yes in S807), the method may include the control circuit 100 supplying power to the mobile communication circuit 120 (S809), determining whether the hole location updating device 10 successfully accesses the mobile communication network by using the mobile communication circuit 120, and transmitting the GPS position data, that is, the latest position data to the server 20 (S811).

The control circuit 100 transmits the GPS position data to the server 20, blocks supplying of power to the mobile communication circuit 120, and may then proceed to waiting for a button input (or a touch sensor input) (S803).

When it is determined as that there is a need to update the hole location, this may signify a case in which a distance difference between the stored position data and the GPS position data is equal to or greater than a predetermined distance. For example, it may be determined as that there is a need to update the hole location when the distance difference between the stored position data and the GPS position data is equal to or greater than several meters such as equal to or greater than 1 m or equal to or greater than 2 m. The above-noted standard is no more than an example, and the policies and algorithms for determining whether there is a need to update the hole location are modifiable in various ways depending on detailed realization purposes.

When the hole location update is determined to be unneeded (No in S807), the method may proceed to waiting for a button input (or a touch sensor input) (S803).

Here, the case of determination as that the hole location is not needed to be updated may signify a case in which a distance difference between the storage position data and the GPS position data is less than a predetermined distance. For example, it may be determined as that there is no need to update the hole location when the distance difference between the storage position data and the GPS position data is less than 1 m. The above-noted standard is an example, and policies and algorithms for determining whether a hole location update is not needed may be determined depending on detailed realization objects.

According to the present embodiment, the hole location updating device 10 supplies power to the mobile communication circuit 120 when the hole location update is determined to be needed, and it blocks the supplying of power to the mobile communication circuit 120 when the hole location update is completed, thereby managing power, and it supplies power to the GPS circuit 140 for a sufficient time frame, so the hole location updating device 10 may minimize power consumption and may provide the accurate hole location to the golfer.

However, in some embodiments of the present invention, the power supplying policy to the mobile communication circuit 120 is not limited to the present embodiment, and the method for supplying power to the mobile communication circuit 120 may be changed in various ways.

Figure 9:
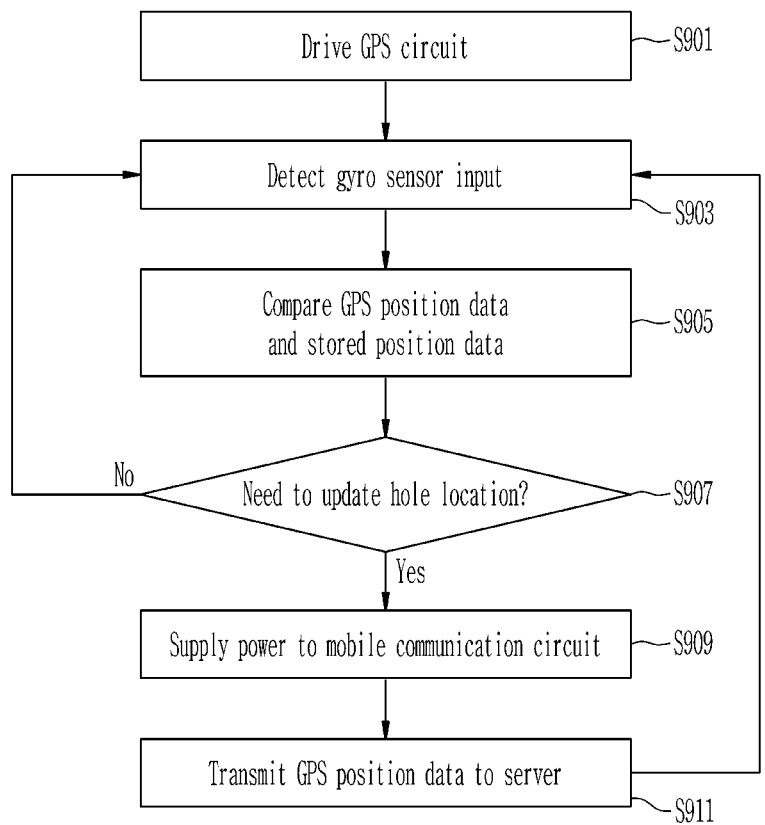
FIG. 9 shows a flowchart of a method for operating a hole location updating device according to an embodiment of the present invention.

FIG. 9 shows a flowchart of a method for operating a hole location updating device according to an embodiment of the present invention.

Referring to FIG. 9, the method for operating a hole location updating device 10 according to an embodiment of the present invention may include the control circuit 100 driving a GPS circuit 140 (S901).

The method may include the control circuit 100 detecting a gyro sensor input (S903). The detecting of a gyro sensor input may include detecting a sensor signal generated by a rotary motion of the hole cutter 5 while the greenkeeper digs a hole. The detection of the sensor signal may be realized by, for example, a known interrupt detecting method, and the range of the present invention is not limited thereto.

It has been described above that the stage of S901 is performed and the stage of S903 is then performed, and when the control circuit 100 detects a gyro sensor input (S903) so as to reduce power consumption by constant driving of the GPS circuit 140, the control circuit 100 may drive the GPS circuit 140 (S901), and the present invention is not limited thereto.

The method may include comparing the position data on the hole location stored in the hole location updating device 10 and the GPS position data (S905).

The method may include determining whether a hole location update is needed based on a result of comparison (S907), and when the hole location update is determined to be needed (Yes in S907), the method may include the control circuit 100 supplying power to the mobile communication circuit 120 (S909), determining whether the hole location updating device 10 successfully accesses the mobile communication network by using the mobile communication circuit 120, and transmitting the GPS position data, that is, the latest position data to the server 20 (S911).

The control circuit 100 transmits the GPS position data to the server 20, blocks supplying of power to the mobile communication circuit 120, and may then proceed to waiting for a sensor input (S903).

When the hole location update is determined to be unneeded (No in S907), the method may proceed to waiting for a sensor input (S903).

According to the present embodiment, the hole location updating device 10 supplies power to the mobile communication circuit 120 when the hole location update is determined to be needed, and it blocks the supplying of power to the mobile communication circuit 120 when the hole location update is completed, thereby managing power, and it supplies power to the GPS circuit 140 for a sufficient time frame, so the hole location updating device 10 may minimize power consumption and may provide the accurate hole location to the golfer.

However, in some embodiments of the present invention, the power supplying policy to the mobile communication circuit 120 is not limited to the present embodiment, and the method for supplying power to the mobile communication circuit 120 may be changed in various ways.

Figure 10:
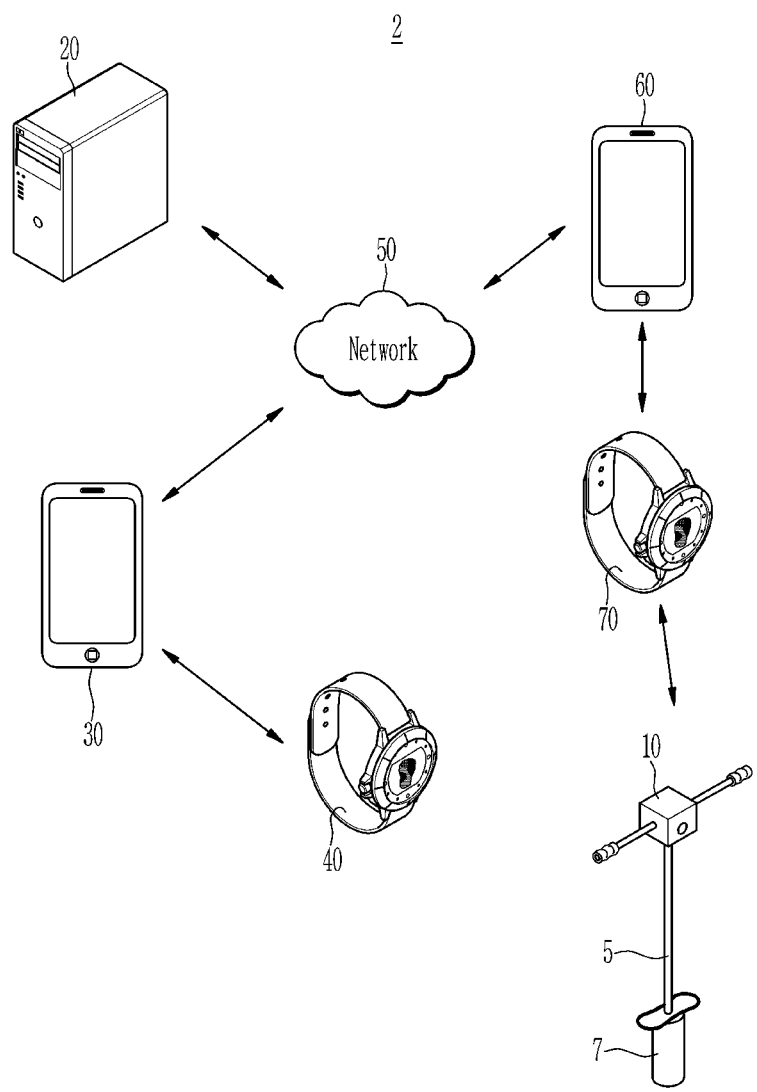
FIG. 10 shows a flowchart of a method for operating a hole location updating system according to an embodiment of the present invention.

FIG. 10 shows a flowchart of a method for operating a hole location updating system according to an embodiment of the present invention.

Referring to FIG. 10, the hole location updating system 2 may include a hole location updating device 10, a server 20, mobile communication devices 30 and 60, and golf distance measuring devices 40 and 70. However, the range of the present invention is not limited thereto, and the hole location updating system 2 may further include additional constituent elements or may omit some constituent elements, compared to what is shown in FIG. 10.

The hole location updating device 10 attached to the hole cutter 5 may measure the current hole location, and may transmit the measured hole location to the golf distance measuring device 70. When the golf distance measuring device 70 provides the hole location received from the hole location updating device 10 to the mobile communication device 60, the mobile communication device 60 transmits the hole location to the server 20 through the network 50, for example, a mobile communication network. The server 20 may transmit the latest hole location to the mobile communication device 30 through the network 50, and the mobile communication device 30 may provide the latest hole location to the golf distance measuring device 40 through, for example, an application performed on a smartphone.

Figure 11:
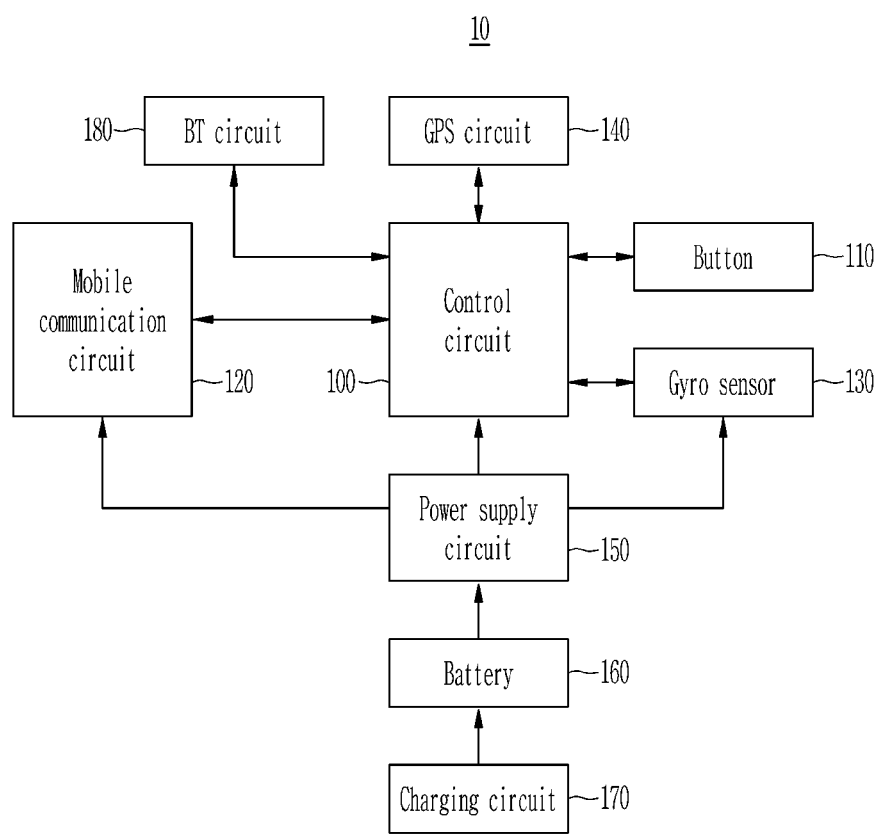
FIG. 11 shows a block diagram of a hole location updating device according to an embodiment of the present invention.

FIG. 11 shows a block diagram of a hole location updating device according to an embodiment of the present invention.

Referring to FIG. 11, the hole location updating device 10 may include a control circuit 100, a button 110, a mobile communication circuit 120, a gyro sensor (130, or a touch sensor), a GPS circuit 140, a power supply circuit 150, a battery 160, and a Bluetooth (BT) circuit 180. Depending on whether the battery 160 is chargeable, the hole location updating device 10 according to the present embodiment may further include a charging circuit 170. Descriptions on the control circuit 100, the button 110, the mobile communication circuit 120, the sensor 130, the GPS circuit 140, the power supply circuit 150, the battery 160, and the charging circuit 170 may refer to what are described with reference to FIG. 3, which will not be repeatedly described.

The BT circuit 180 may provide a Bluetooth communication interface for transmitting the hole location measured by the hole location updating device 10 to the golf distance measuring device 70. That is, the BT circuit 180 may provide a communication environment for transmitting the hole location data transmitted to the network 50 by the hole location updating device 10 to the network 50 through the golf distance measuring device 70 and the mobile communication device 60 from among the descriptions provided with reference to FIG. 1 to FIG. 9.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A hole location updating device including a hole cutter combiner providing a combination to a hole cutter, comprising:
a GPS circuit for detecting a global positioning system (GPS) position on the hole location updating device;
a mobile communication circuit for providing an access to a server through a mobile communication network; and
a control circuit for transmitting the GPS position to the server by use of the mobile communication circuit in response to a wakeup signal,
wherein the control circuit compares map information including position information on a golf course and the GPS position, and determines whether the hole location updating device is disposed in a green of the golf course, and
wherein the control circuit sets a data update period of the GPS circuit to be a first period when the hole location updating device is not disposed in the green of the golf course, and sets the data update period of the GPS circuit to be a second period that is different from the first period when the hole location updating device is disposed in the green of the golf course.

2. The hole location updating device of claim 1, wherein the control circuit supplies power to the mobile communication circuit in response to the wakeup signal, transmits the GPS position to the server, and blocks supplying of power to the mobile communication circuit.

3. The hole location updating device of claim 1, wherein the hole location updating device includes at least one button, and
the wakeup signal is generated from a button input generated by the at least one button.

4. The hole location updating device of claim 1, wherein the hole location updating device further includes a sensor, and
the wakeup signal is generated from a sensor input generated by the sensor.

5. The hole location updating device of claim 4, wherein the sensor includes a gyro sensor, and
the sensor input is generated when a rotary motion of the hole location updating device is detected.

6. The hole location updating device of claim 4, wherein the sensor includes a touch sensor, and
the sensor input is generated when a tap operation of a user is detected.

7. A hole cutter comprising:
an excavator for excavating ground;
a GPS circuit for detecting a GPS position;
a mobile communication circuit for providing access to a server through a mobile communication network; and
the mobile communication circuit includes a control circuit for transmitting the GPS position to the server in response to a wakeup signal generated by at least one button or sensor,
wherein the control circuit compares map information including position information on a golf course and the GPS position, and determines whether the hole cutter is disposed in a green of the golf course, and
wherein the control circuit sets a data update period of the GPS circuit to be a first period when the hole cutter is not disposed in the green of the golf course, and sets the data update period of the GPS circuit to be a second period that is different from the first period when the hole cutter is disposed in the green of the golf course.

8. A hole location updating system comprising:
a hole location updating device; and
a server,
wherein the hole location updating device includes
a hole cutter combiner for providing a combination to a hole cutter,
a GPS circuit for detecting a global positioning system (GPS) position on the hole location updating device,
a mobile communication circuit for providing access to the server through a mobile communication network, and
a control circuit for transmitting the GPS position to the server by use of the mobile communication circuit in response to a wakeup signal, and the server compares a stored hole location and the GPS position received from the hole location updating device and determines whether to update the stored hole location with the GPS position, wherein the control circuit compares map information including position information on a golf course and the GPS position, and determines whether the hole location updating device is disposed in a green of the golf course, and wherein the control circuit sets a data update period of the GPS circuit to be a first period when the hole location updating device is not disposed in the green of the golf course, and sets the data update period of the GPS circuit to be a second period that is different from the first period when the hole location updating device is disposed in the green of the golf course.

9. The hole location updating system of claim 8, wherein the hole location updating device includes at least one button, and the wakeup signal is generated from a button input generated by the at least one button.

10. The hole location updating system of claim 8, wherein the hole location updating device further includes a sensor, and the wakeup signal is generated from a sensor input generated by the sensor.

11. A hole location updating device including a hole cutter combiner providing a combination to a hole cutter, comprising:

a GPS circuit for detecting a GPS position on the hole location updating device;

a mobile communication circuit for providing access to a server through a mobile communication network; and a control circuit for comparing a stored hole location and the GPS position detected by the GPS circuit to determine whether a hole location update is needed in response to a wakeup signal, and transmitting the GPS position to a server when the hole location update is determined to be needed, wherein the control circuit compares map information including position information on a golf course and the GPS position to determine whether the hole location updating device is disposed in a green of the golf course, and wherein the control circuit sets a data update period of the GPS circuit to be a first period when the hole location updating device is not disposed in the green of the golf course, and sets the data update period of the GPS circuit to be a second period that is different from the first period when the hole location updating device is disposed in the green of the golf course.

12. The hole location updating device of claim 11, wherein when the hole location update is determined to be needed, the control circuit supplies power to the mobile communication circuit, and transmits the GPS position to the server by using the mobile communication circuit.

13. The hole location updating device of claim 12, wherein the control circuit transmits the GPS position to the server by using the mobile communication circuit, and blocks supplying of power to the mobile communication circuit.

14. The hole location updating device of claim 11, wherein the hole location updating device includes at least one button, and the wakeup signal is generated from a button input generated by the at least one button.

15. The hole location updating device of claim 11, wherein the hole location updating device further includes a sensor, and the wakeup signal is generated from a sensor input generated by the sensor.

16. The hole location updating device of claim 15, wherein the sensor includes a gyro sensor, and the sensor input is generated when a rotary motion of the hole location updating device is detected.

* * * * *